(12) United States Patent
Dempski et al.

(10) Patent No.: US 7,890,750 B2
(45) Date of Patent: Feb. 15, 2011

(54) ENCRYPTION AND DECRYPTION ON A GRAPHICS PROCESSING UNIT

(75) Inventors: Kelly L. Dempski, Evanston, IL (US); Manoj Seshadrinathan, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1160 days.

(21) Appl. No.: 11/580,433

(22) Filed: Oct. 13, 2006

(65) Prior Publication Data

US 2008/0008314 A1    Jan. 10, 2008

Related U.S. Application Data

(60) Provisional application No. 60/819,144, filed on Jul. 6, 2006.

(51) Int. Cl.
*H04L 29/06* (2006.01)
(52) U.S. Cl. .................................... 713/153
(58) Field of Classification Search ............. 380/28–30, 380/255–283; 713/150–154, 160–167, 189–193
See application file for complete search history.

(56) References Cited

U.S. PATENT DOCUMENTS

| | | | | |
|---|---|---|---|---|
| 7,702,100 | B2* | 4/2010 | Han et al. ...................... | 380/28 |
| 2003/0154367 | A1* | 8/2003 | Kawai ........................... | 713/1 |
| 2003/0198345 | A1* | 10/2003 | Van Buer ..................... | 380/43 |
| 2005/0213756 | A1* | 9/2005 | Hubert ......................... | 380/44 |
| 2006/0242710 | A1* | 10/2006 | Alexander ................... | 726/24 |

OTHER PUBLICATIONS

Shen et al., Accelerate Video Decoding with Generic GPU, May 2005, IEEE Transactions on Circuits and Systems for Video Technology, vol. 15, No. 5.*
Bernstein, D.J., "Cache-timing attacks on AES," University of Illinois, Chicago (2005).
Cook, D., et al., "Secret Key Cryptography Using Graphics Cards," Technical Report, Columbia University, New York (Jan. 2004).
Daemen, J. et al., "The Design of Rijndael AES—The Advanced Encryption Standard," Springer, Berlin, 2002, pp. 33, 54, and 55.
Engel, W. F., "ShaderX 2: Introduction and Tutorials with DirectX9," Wordware Publishing, 2003, pp. 1-6.
Guha, S. et al., "Data Visualization and Mining using the GPU," Tutorial in ACM International Conference on Knowledge Discovery and Data Mining (KDD 2005), slides 1, 2, and 94.
Harris, M., "Mapping computational concepts to GPUs," in GPU Gems 2: Programming Techniques for High-Performance Graphics and General-Purpose Computation, Addison-Wesley, 2005, pp. 493-508.
Cook, D. L., et al., "CryptoGraphics: Secret Key Cryptography Using Graphics Cards," pp. 334-350, XP-002456154, Jul. 16, 2004.
Daemen J et al: "AES Proposal: Rijndael" AES Proposal, Sep. 3, 1999, pp. 1-45, XP-001060386.
European Search Report (Corresponding European Application No. EP 07 25 2714), Jun. 11, 2007.

* cited by examiner

*Primary Examiner*—Matthew B Smithers
*Assistant Examiner*—Jing Sims

(57) ABSTRACT

A system, method, and processor executable instructions are disclosed for offloading encryption and/or decryption processing to a system having a parallel processing structure that may include a graphics processing unit. Lookup tables support executing encryption/decryption transformations solely on the graphics processing unit. In one version, the look-up tables support Rijndael encryption/decryption transformations. Also, a system, method, and processor executable instructions are disclosed for visualizing decrypted ciphertext.

20 Claims, 15 Drawing Sheets

1602

140

| 0 0 0 0 | .33 0 0 0 | .66 0 0 0 | 1 0 0 0 |
|---|---|---|---|
| 0 .2 0 0 | .33 .2 0 0 | .66 .2 0 0 | 1 .2 0 0 |
| 0 .4 0 0 | .33 .4 0 0 | .66 .4 0 0 | 1 .4 0 0 |
| 0 .6 0 0 | .33 .6 0 0 | .66 .6 0 0 | 1 .6 0 0 |
| 0 .8 0 0 | .33 .8 0 0 | .66 .8 0 0 | 1 .8 0 0 |
| 0 1 0 0 | .33 1 0 0 | .66 1 0 0 | 1 1 0 0 |

ENCRYPTION AND DECRYPTION ON A GRAPHICS PROCESSING UNIT

CROSS-REFERENCE TO RELATED APPLICATION

This application claims the benefit of U.S. Provisional Application No. 60/819,144, filed Jul. 6, 2006, which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

This application includes a computer program listing appendix, which is hereby incorporated herein by reference, on a compact disk (filed in duplicate, "Copy 1" and "Copy 2") having the following files: Encryption.txt, Decryption.txt, and Visualization.txt. The duplicate compact disks each have 18 kilobytes and were created on Oct. 13, 2006.

BACKGROUND OF THE INVENTION

1. Technical Field

This invention relates to encryption and decryption techniques. In particular, this invention relates to offloading encryption and decryption processing to a graphics processing unit. The invention also relates to displaying decrypted data from a graphics processing unit.

2. Related Art

Encryption is the process of obscuring data to produce code ("ciphertext") that is unreadable without special knowledge. Decryption is the process of deciphering the ciphertext and recovering the data. There are a variety of techniques for encrypting and decrypting data including block cipher cryptography, stream cipher cryptography, and public-key cryptography. The National Institute of Standards and Technology (NIST) has adopted a method of block cipher cryptography, called Rijndael encryption, as the Advanced Encryption Standard (AES) for encrypting data.

Rijndael encryption is a process of applying data and an encryption key to an algorithm, called the Rijndael algorithm, for producing ciphertext. The Rijndael encryption process encrypts data in blocks having sixteen data bytes. The data bytes are grouped together in a 4-column-by-4-row block called a state. The data bytes may correspond to alphanumerical characters, symbols, commands, account data, or other type of information. Prior to encryption, an initial encryption key is expanded into ten round-keys. Each round-key has sixteen bytes (one round-key for each byte of data) grouped together in a 4-column-by-4-row round-key block.

The Rijndael algorithm is iterative and consists of 10 rounds. Each round is a sequence of four transformations, known as: AddRoundKey, SubBytes, ShiftRows, and MixColumns. The result of each transformation is referred to as the "state", and each round operates on the state from the previous round. Each round utilizes its own round-key.

The AddRoundKey transformation combines each byte of the state with a corresponding byte of the round-key by an XOR operation.

The SubBytes transformation replaces each byte of the state with a byte from a look-up table known as the Rijndael S-box.

The ShiftRows transformation operates on the rows of the state. ShiftRows cyclically shifts the bytes in each row by a certain offset so that each column of the output state has a byte from the other three columns of the input state. In ShiftRows, the first row is left unchanged; each byte of the second row is shifted one column to the left; each byte of the third row is shifted two columns to the left; and each byte of the fourth row is shifted three columns to the left. Bytes in the first columns of rows wrap around to the fourth column when a shift is made.

In the MixColumns transformation, each column is treated as a polynomial and multiplied by a matrix in Rijndael's finite field.

Executing a Rijndael encryption program on a processor consumes a significant amount of processor time. Operating on a general purpose system processor, the program may significantly decrease the performance of other system programs such as word processors, spreadsheets, and email clients. A program executing Rijndael decryption similarly consumes a significant amount of processor time and impacts other system programs.

SUMMARY

There presently exists a need to relieve a general purpose system processor ("system processor") in a computing system of the task of encrypting and/or decrypting data.

A disclosed system relieves the system processor of the task of encrypting and or encrypting data. A first implementation of the system includes a graphics processing unit ("GPU") in communication with the system processor. The system processor executes first processor executable instructions, such as a setup program, for communicating to the GPU second processor executable instructions. The first processor executable instructions include instructions for communicating an unencrypted texture, encryption round-keys, at least one look-up texture, and the second processor executable instructions to the GPU. The second processor executable instructions include an encryption program, such as a pixel shader encryption program, for configuring the GPU to execute encryption acts. The first and second sets of processor executable instructions may be stored in one or more computer readable storage mediums.

A second implementation of the system includes a GPU in communication with a system processor. The system processor executes first processor executable instructions, such as a setup program, for communicating to the GPU second processor executable instructions. The first processor executable instructions include instructions for communicating an encrypted texture, encryption round-keys, at least one look-up texture, and the second processor executable instructions to the GPU. The second processor executable instructions include a decryption program, such as a pixel shader decryption program, for configuring the GPU to execute Rijndael decryption transformations. The first and second sets of processor executable instructions for decryption may be stored in one or more computer readable storage mediums.

In one version, the second set of processor executable instructions for decryption also includes instructions to communicate a gradient texture, an ASCII texture, a linearizer texture, and a visualization program to the GPU for displaying decrypted data, without communicating with the system processor. In other versions, one or more sets of processor executable instructions, separate from the second set of processor executable instructions, cause the system processor to communicate the textures and visualization program to the GPU.

A disclosed method of performing encryption acts may be executed by a GPU. The method includes receiving from a system processor an unencrypted texture, a look-up texture, ten encryption round-keys, and an encryption program. In one version the encryption program has instructions for performing Rijndael transformations. A first act combines the AddRoundKey, SubBytes, and ShiftRows transformations. The first act includes obtaining, for each data byte in a state block, a substitution byte from a modified S-box look-up table in the look-up texture. The modified S-box look-up table implements the AddRoundKey and SubBytes transformations. The first act includes writing the substitution bytes into the state block at locations that correspond to a ShiftRows transformation.

The second act includes referencing an XOR look-up table and a combined finite field multiplication/XOR look-up table (xXOR table) in the look-up texture to implement the MixColumns transformation. The second act is repeated for each column in the state.

A disclosed method of performing decryption acts may be executed by a GPU. The method includes receiving from a system processor an encrypted texture, at least one look-up texture, encryption round-keys, and a decryption program. In one version the decryption program has instructions for performing Rijndael transformations. A first act of the method includes referencing a look-up texture having an XOR look-up table to implement an AddRoundKey transformation. A second act of the method includes referencing a look-up texture having a look-up table having values derived by a combination XOR and two finite field multiplication operations to implement an InverseMixColumns preprocessing transformation. A third act of the method includes referencing a look-up texture having a combined finite field multiplication/XOR look-up table (xXOR table) to implement an InverseMixColumns transformation. A fourth act of the method includes writing the values obtained from the xXOR table into locations in the state block that correspond to a InverseShiftRows transformation. A fifth act of the method includes referencing a look-up texture having a one-dimensional S-box look-up table to implement an InverseSubBytes transformation.

In one version, decrypted data is written to GPU render targets and a visualization display program is executed to present the data in a readable format on a display or other visually perceivable device. In one version, the system processor uploads to the GPU a visualization program, a gradient texture, an ASCII texture, and a linearizer texture. The system processor provides a signal to initiate execution of the visualization program in the GPU.

According to one version of a visualization program, the linearizer texture is expanded and tiled to have the decrypted data made available for output. A character block in the ASCII texture is indexed to based upon an outputted data value, and the gradient texture directs the program to the ASCII texels for the remainder of the character block.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 16 shows a gradient texture for use in visualizing decrypted data on the GPU.

DETAILED DESCRIPTION

Figure 1:
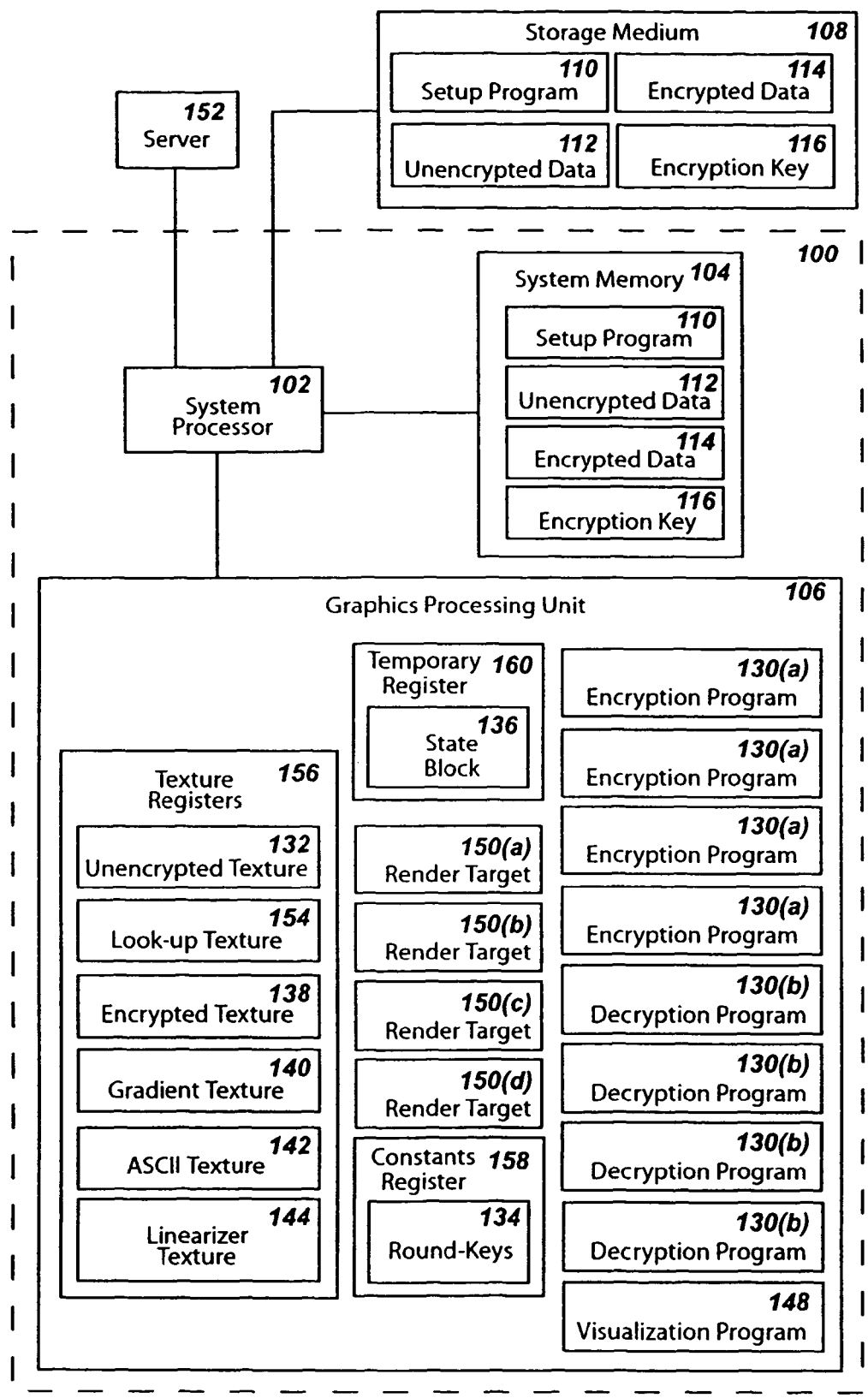
FIG. 1 illustrates an encryption/decryption system.

FIG. 1 illustrates an encryption/decryption system 100 configured to execute encryption acts, decryption acts, and/or GPU visualization acts. Encryption and decryption acts include transformations in furtherance of encrypting or decrypting data, respectively. GPU visualization acts include displaying data derived from ciphertext by a GPU without communicating the data to a second processor.

The encryption/decryption system 100 includes a system processor 102 in communication with a system memory 104 and a GPU 106. The system processor 102 may be a general purpose system processor such as a central processing unit in a PC or other processor configured to execute instructions. The system memory 104 is preferably processor memory such as a random access memory (e.g., SRAM or DRAM). The GPU 106 has multiple texture registers 156, a constants register 158, a temporary register 160, and a parallel processing structure.

The encryption/decryption system 100 may communicate with a storage medium 108 such as a ROM, hard drive, removable drive, or other computer readable storage medium. The encryption/decryption system 100 may communicate with more than one storage medium 108. For example, an executable program may be stored in ROM, information for encrypting data may be stored in a first moveable memory such as a Flash memory device, and unencrypted data may be stored in a second moveable memory. The encryption/decryption system 100 may also be configured to communicate to a server 152 in communication with other systems, including computer networks.

A setup program 110 has setup instructions for configuring the encryption/decryption system 100 to perform any combination of encryption, decryption, or GPU decryption visualization. The setup program 110 may reside within the encryption/decryption system 100, such as in the system memory 104. The setup program 110 may also, or otherwise, reside in a storage medium 108 to be read by the encryption/decryption system 100, in a device in communication with the server 152, or in or at other sources accessible by the encryption/decryption system 100.

Figure 2:
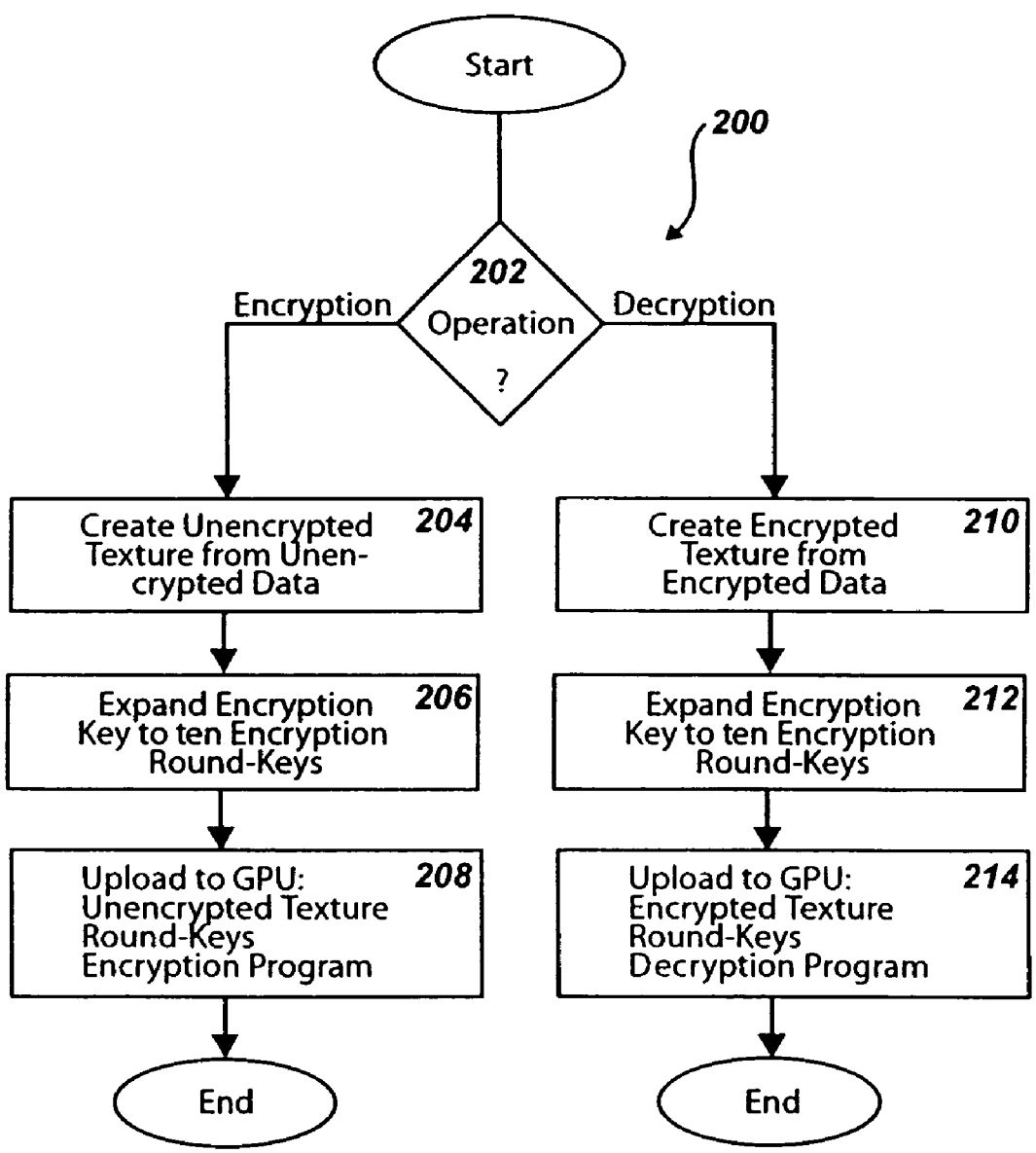
FIG. 2 shows setup instructions for the encryption/decryption system of FIG. 1.

One version of setup instructions 200 is shown in FIG. 2. The setup instructions 200 include making a determination of whether to encrypt data or decrypt ciphertext (Act 202). In one version, the determination is based upon receiving either a first signal, indicating encryption, or a second signal, indicating decryption. Such signals may originate from a user interface, a program running on or in communication with the encryption/decryption system 100, the setup program 110, or other source.

If the encryption/decryption system 100 is to encrypt data, an unencrypted texture 132 is created from the unencrypted data 112 (Act 204) and ten round-keys 134 are derived from the encryption key 116 (Act 206). The unencrypted texture 132, the round-keys 134, and one or more encryption program(s) 130(a) are uploaded to the GPU 106 (Act 208). The encryption programs 130(a) may be shader programs written in RenderMan or DirectX shader language, as examples. A version of an encryption program (Encryption-.txt) is included in the appendix of this application.

Figure 3:
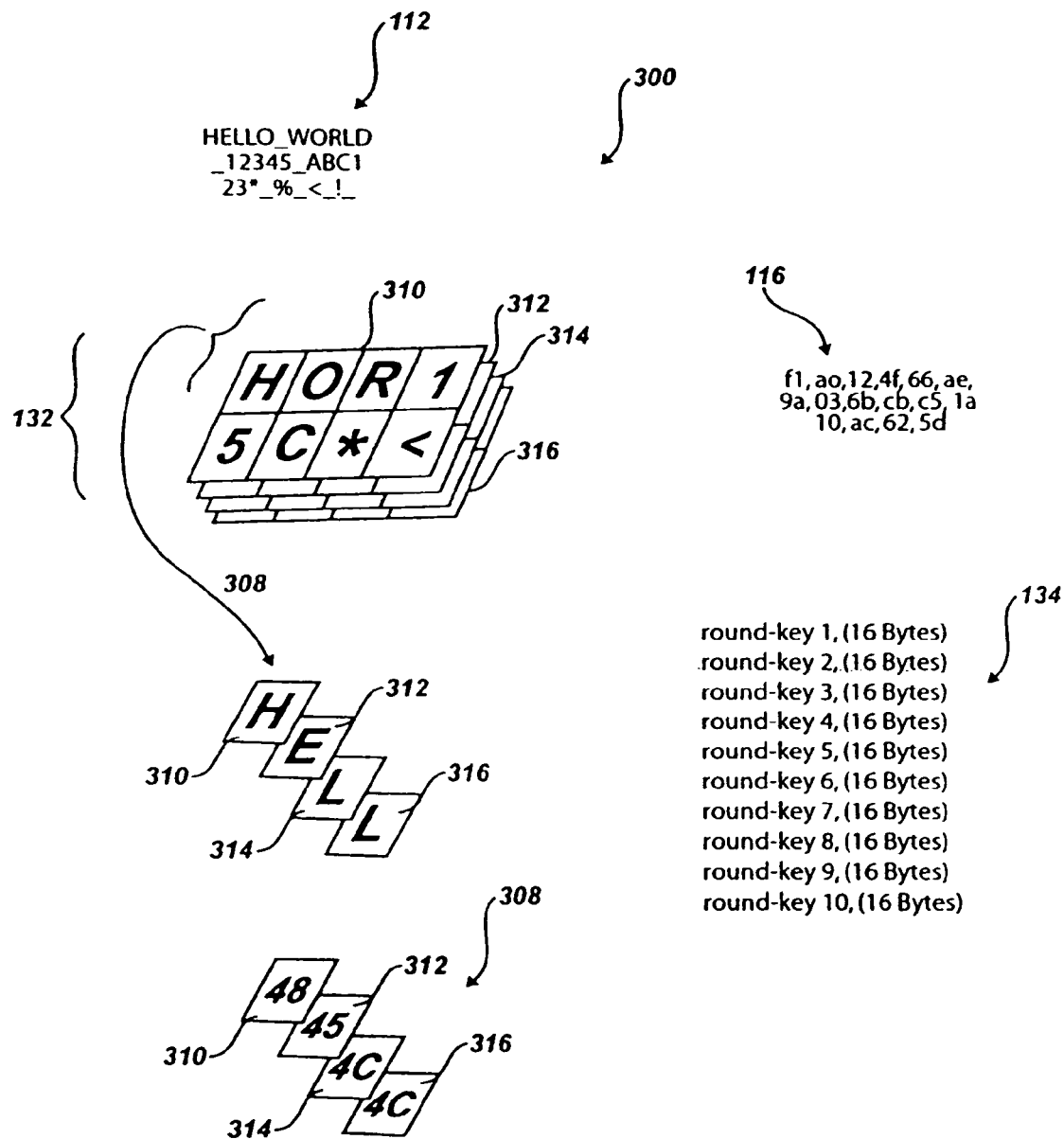
FIG. 3 shows encryption data, including unencrypted data and an encryption key.

FIG. 3 shows an example of data 300 for use in encryption. The data 300 includes unencrypted data 112, which, in the example, is a series of alphanumerical characters ("HELLO_WORLD__12345_ABC123*_%_<_!__2"), and a 16 byte encryption key 116. For encryption processing on a GPU, the unencrypted data 112 are packed into an unencrypted texture 132. In the present example, the unencrypted texture 132 is a 4×2 (column×row) texture, comprising eight texels, including a first unencrypted texel 308 at 1×1. The unencrypted texture 132, and therefore each unencrypted texel, has a red channel 310, a blue channel 312, a green channel 314, and an alpha channel 316. Each alphanumerical character is represented by an 8-bit binary value (equivalent hexadecimal values are shown in the drawings for clarity). For example, the first unencrypted texel 308 has a red channel 310 having an ASCII "H" (48 hex), a blue channel 312 having an "E" (45), a green channel 314 having an "L" (4c), and an alpha channel 316 having an "L" (4c).

The unencrypted data 112 may be communicated to or retrieved by the encryption/decryption system 100. For example, the unencrypted data 112 may be communicated to the encryption/decryption system 100 by a user through a user interface, read from the storage medium 108, or received from a server 152 or other device. The encryption key 116 may also be communicated to or retrieved by the encryption/decryption system 100 in different ways.

The encryption key 116 includes sixteen 8-bit (equivalent hexadecimal values are shown in the drawings for clarity) bytes. The system processor 102 may execute instructions to expand the encryption key 116 into ten 16-byte encryption round-keys 134.

Figure 4:
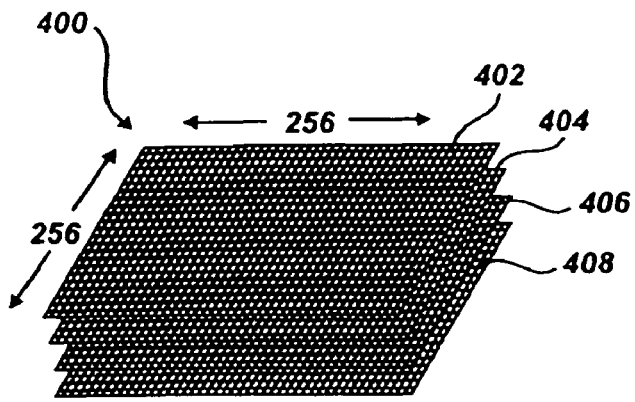
FIG. 4 represents an encryption look-up texture having channels having look-up tables for use to implement Rijndael encryption/decryption transformations.

One implementation of the encryption program(s) 130(a) utilizes look-up tables for executing Rijndael encryption transformations. The look-up tables may include a modified S-box table, an XOR table, and an xXOR table (modified XTime table) and may be packed into one or more encryption look-up texture(s) 154. FIG. 4 illustrates an example of a 256×256 encryption look-up texture 400 having 65,536 texels. Each texel has a red channel 402, a blue channel 404, a green channel 406, and an alpha channel 408. In a version of the look-up texture, the modified S-box table is packed into the alpha channel 408, the XOR table is packed into the blue channel 406, and the xXOR table is packed into the green channel 404.

Figure 5:
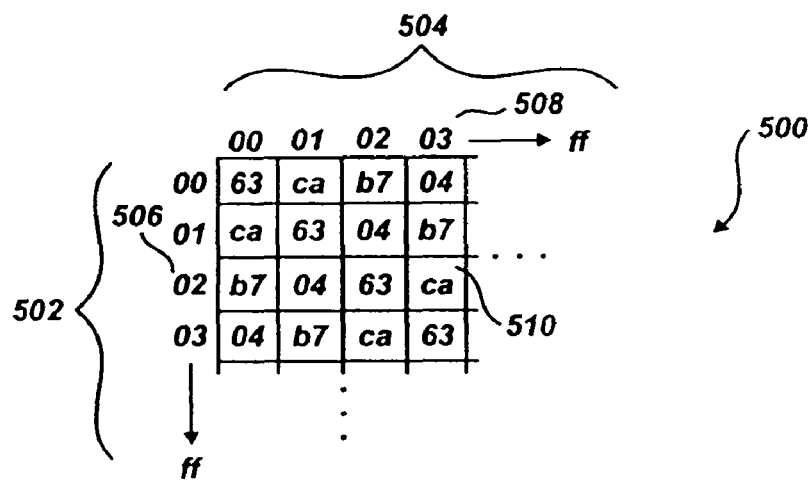
FIG. 5 shows a sample region of a modified Rijndael S-box look-up table of a channel of the look-up texture of FIG. 4.

FIG. 5 illustrates a portion of the modified S-box table 500. The modified S-box table 500 has row address values 502 corresponding to state values ranging from 00 to ff, and column address values 504 corresponding to round-key values ranging from 00 to ff. The modified S-box table 500 is an (a) XOR operation table for each row and address value pair, (b) having all resultant values of the XOR operation substituted with values from the Rijndael S-box. For example, the XOR result of state value "02" 506 and round-key value "03" 508 is "01". According to the Rijndael S-box, the substitution value for "01" is "ca".

Figure 6:
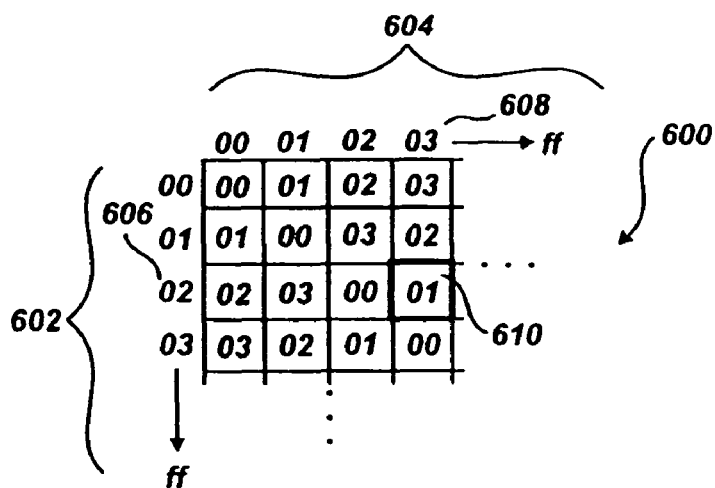
FIG. 6 shows a sample region of an XOR look-up table of a channel of the look-up texture of FIG. 4.

FIG. 6 illustrates a portion of the XOR table 600. The XOR table 600 has row addresses 602 corresponding to values ranging from 00 to ff, and column addresses 604 corresponding to values ranging from 00 to ff. The XOR table 600 provides a pre-computed XOR operation table for each row and address value pair. For example, the XOR result of "02" 606 and "03" 608 is "01". The XOR table 600 is referenced to obtain values for a MixColumns transformation algorithm for encryption, discussed below.

Figure 7:
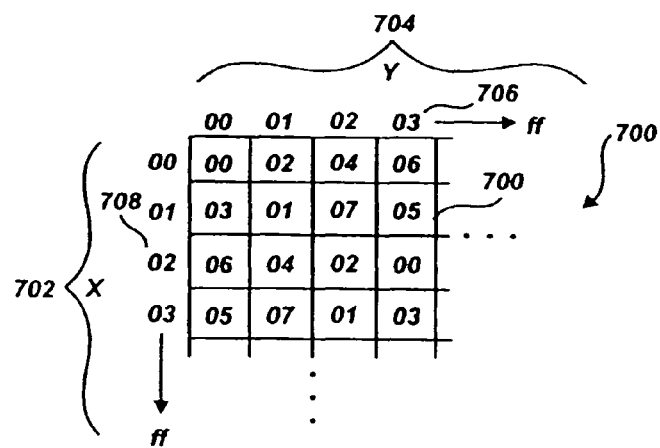
FIG. 7 shows a sample region of an xXOR look-up table of a channel of the look-up texture of FIG. 4.

FIG. 7 illustrates a portion of the xXOR table 700. The xXOR table 700 is a modified XTime operation table. The xXOR table 700 has row addresses 702 corresponding to "x" values ranging from 00 to ff, and column addresses 704 corresponding to "y" values ranging from 00 to ff. The elements are derived from the formula: xXOR(x,y)=x^(XTime (x^y)); where XTime denotes a finite field multiplication by 02, and ^ denotes the XOR operation. In other words, the xXOR table is populated with elements having values resulting from (a) an XOR operation for each row and column address pair, (b) a finite field multiplication by 02 to the XOR operation result, and (c) an XOR operation of the row value and the finite field multiplication result. For example, referring to x=01, 708, and y=03, 706, x^y="02"; XTime(02)="04"; and 01^04="05". Accordingly, element 710 of the xXOR table 700 is "05". The xXOR table 700 is referenced to obtain values for the MixColumns transformation algorithm for encryption.

Figure 8:
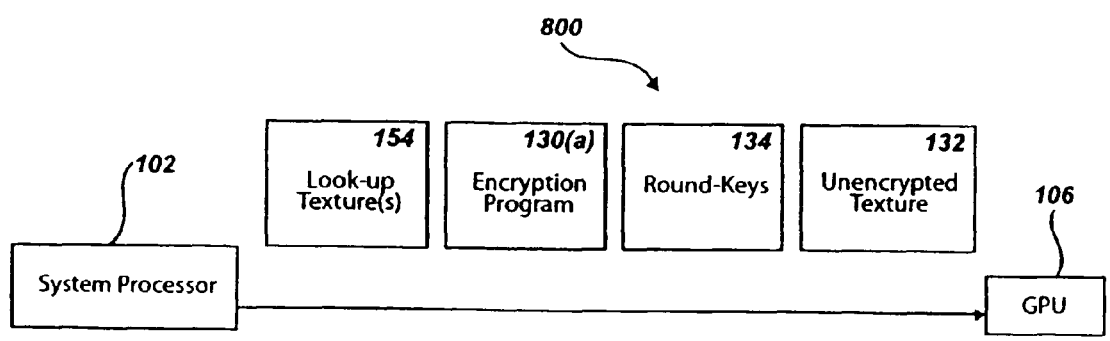
FIG. 8 illustrates the acts that the system may take to upload encryption data and program files from a system processor to a GPU.

As discussed above with reference to FIG. 2, and illustrated in FIG. 8, the acts of one version of setup instructions 200 for encryption include uploading 800 to the GPU the unencrypted texture 132, the round-keys 134, at least one encryption program 130(a), and the look-up texture 154. The unencrypted texture 132 and the look-up texture 154 are uploaded to GPU texture registers 156, and the round-keys 134 are uploaded to a GPU constants register 158.

Figure 9:
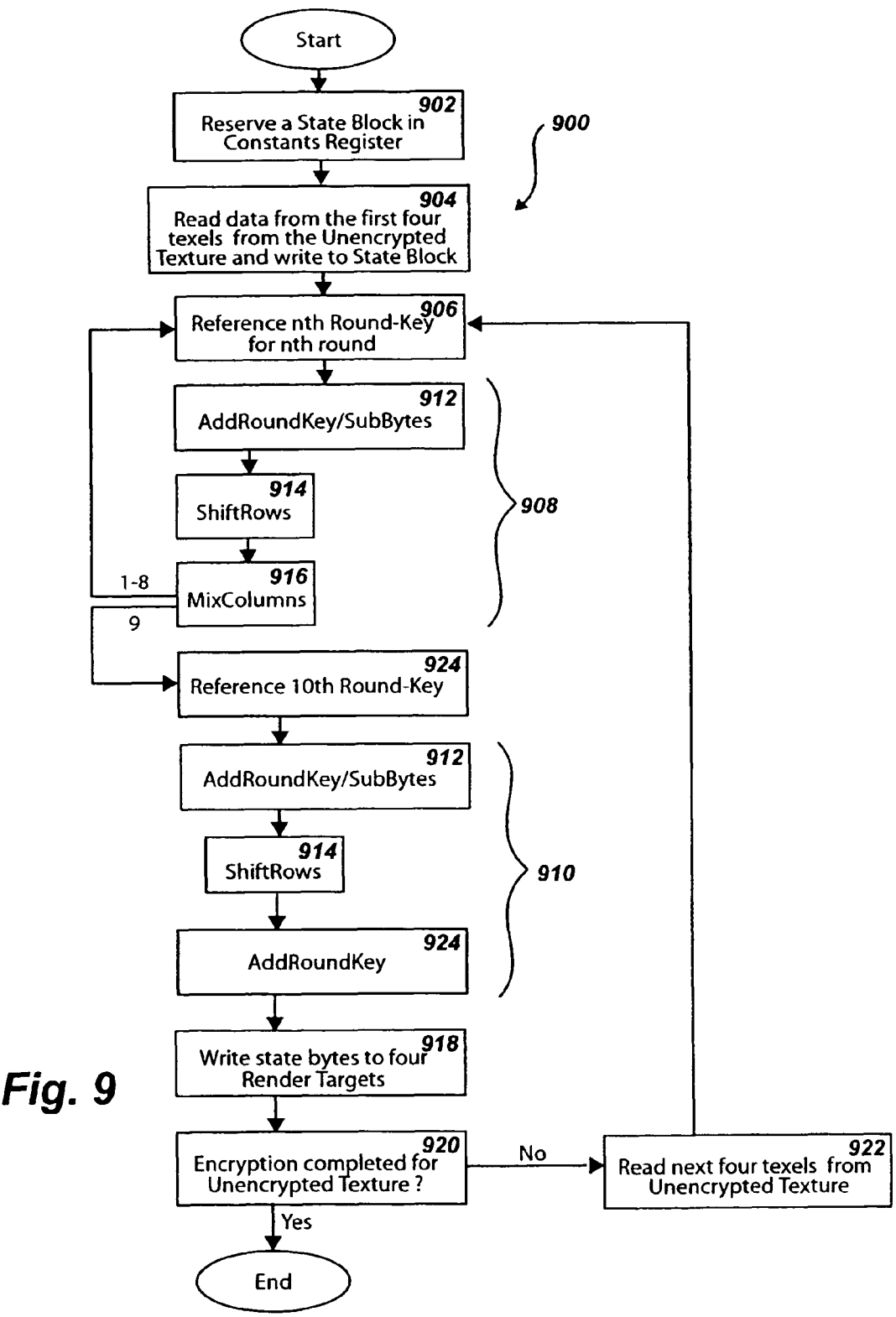
FIG. 9 shows the acts that the system may take to encrypt data on a GPU

The GPU 106 executes the encryption program(s) 130(a) in response to an initiate instruction received from the system processor 102. FIG. 9 shows encryption acts 900 performed according to a preferred version of an encryption program 130(a). A 16-byte state block 136 is reserved in the temporary register 160 for the encryption state (Act 902). The state block 136 receives a first set of 16 bytes of data from the unencrypted texture 132 (Act 904). Note that the state block 136 will also hold the intermediate and final results of encryption transformations as they occur. The number of state blocks created may correspond to the number of encryption program(s) 130(a) running in the GPU. For example, if there are four encryption programs 130(a) running on four parallel processors, then four state blocks are preferably reserved in the temporary register.

A first round-key, having sixteen bytes, is referenced by the GPU from the GPU constants register (Act 906) for the first round. Note that a subsequent round-key is referenced for each subsequent round. In other words, the first round-key is referenced for the first round, the second round-key is referenced for the second round, the third round-key is referenced for the third round, etc.

The encryption transformations are grouped into two stages. In a first stage 908, the AddRoundKey/SubBytes, ShiftRows, and MixColumns transformations (912, 914, and 916) are performed in sequence nine times before moving to a second stage 910. After the first stage 908 is complete, the tenth round-key is referenced (Act 924). A second stage 910 includes an AddRoundKey/SubBytes transformation (Act 912), a ShiftRows transformation (Act 914), and an AddRoundKey transformation (Act 924), which is the final encryption transformation for a set of four texels. After the final AddRoundKey transformation (Act 924), the state block 136 holds sixteen bytes of Rijndael ciphertext.

The encryption transformations will now be discussed. The AddRoundKey/SubBytes transformation (Act 912) comprises sixteen look-ups into the modified S-box table 500. Each look-up is for one of the sixteen state byte and round-key byte member pairs. Like the Rijndael AddRoundKey step, the members of each pair are from matching locations in the round-key and the state block. For example, the state byte at column three, row two is paired with the round-key byte at column three, row two. Each look-up in the modified S-box table 500 is to an element having a row address value 502 corresponding to the state byte and a column address value 504 corresponding to the round-key byte. Each retrieved byte is written into the state block at a location corresponding to a ShiftRows transformation (Act 914) relative to the initial location of the state byte.

Figure 10:
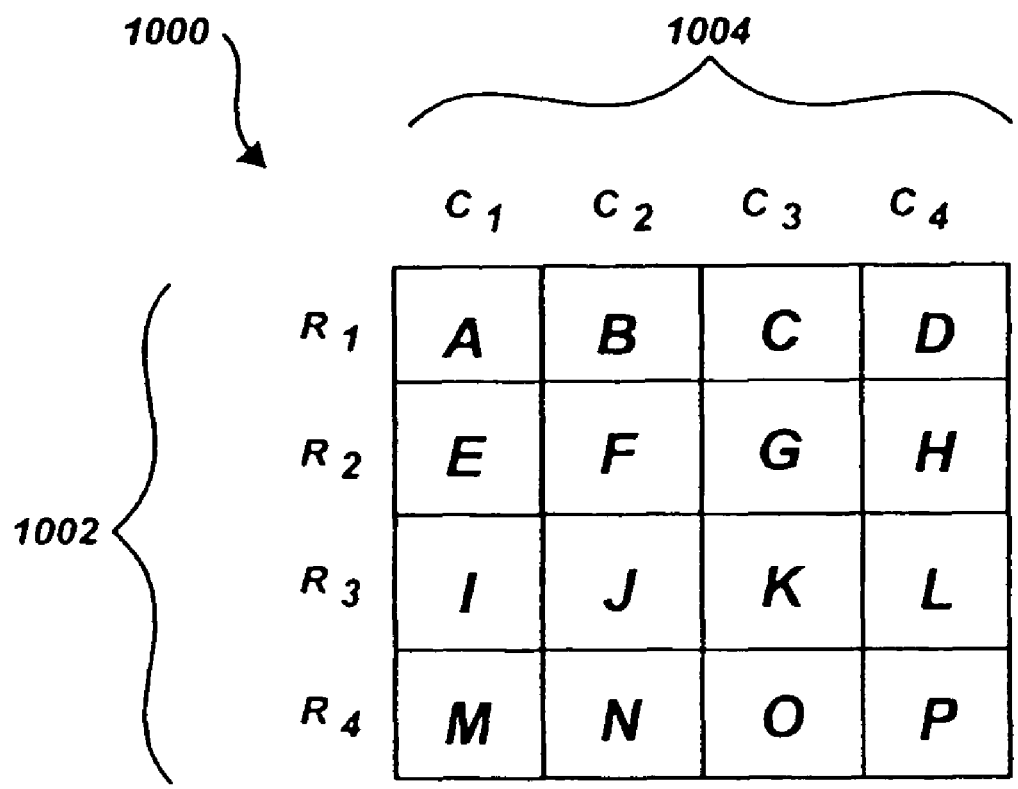
FIG. 10 shows a state for a MixColumns transformation.

The MixColumns transformation (Act 916) can best be explained with reference to an illustrated state 1000, shown in FIG. 10. The illustrated state 1000 holds the values of a state block prior to a MixColumns transformation. The rows 1002 of the illustrated state 1000 are denoted R1, R2, R3, and R4, and the columns 1004 are denoted C1, C2, C3, and C4. The elements are represented by variables A to P. A preferred algorithm (expressed for C1) for executing a MixColumns transformation (Act 916) utilizes several look-ups into the encryption look-up texture 400. The algorithm is performed for each column:

| Algorithm 1: MixColumns transformation for encryption | |
|---|---|
| T = (A^E)^(I^M); | reference the XOR table 600 three times to perform the XOR operation among all elements in a column |
| U = A; | save the initial value of the first row of the column |
| V = xXOR(A, E); | reference the xXOR table 700 to obtain V |
| A = V^T; | reference the XOR table 600 for one XOR operation |

| Algorithm 1: MixColumns transformation for encryption | |
|---|---|
| V = xXOR(E, I); | reference the xXOR table 700 to obtain V |
| E = V^T; | reference the XOR table 600 for one XOR operation |
| V = xXOR(I, M); | reference the xXOR table 700 to obtain V |
| I = V^T; | reference the XOR table 600 for one XOR operation |
| V = xXOR(M, U); | reference the xXOR table 700 to obtain V |
| M = V^T; | reference the XOR table 600 for one XOR operation |

At the completion of the second stage 910, the bytes of ciphertext from the state block 136 are written to four render targets (Act 918). The bytes of the first column of the state block 136 are written to the first render target 150(a), the bytes of the second column are written to a second render target 150(b), the bytes of the third column are written to the third render target 150(c), and the bytes of the fourth column are written to the fourth render target 150(d).

The status of encryption is determined (Act 920). If encryption is not complete, then the data bytes from the next four texels in the unencrypted texture 132 are written to the state block 136 (Act 922) and the first round-key is obtained from the round-key constants register (Act 906). The encryption transformation stages are repeated and the ciphertext of the final state is written to the four render targets 150(a)-150(d). Encryption acts may continue until encryption is complete.

The encryption program may include further acts (not shown) for uploading the ciphertext from the render targets 150(a) to 150(d) to the system processor 102 for storage, recordation, transmission, or other purpose.

Referring again to FIGS. 1 and 2, a version of the setup program 110 has setup instructions for configuring the encryption/decryption system 100 to perform decryption acts. An encrypted texture 138 is created from the encrypted data 114 (Act 210) and ten round-keys 134 are derived from the encryption key 116 (Act 212). The encrypted texture 138, the ten round-keys 134, and one or more decryption program(s) 130(b) are uploaded to the GPU (Act 214). The decryption programs 130(b) may be shader programs in RenderMan or DirectX shader language, as examples. A version of a decryption program (Decryption.txt) is included in the appendix of this application.

Figure 11:
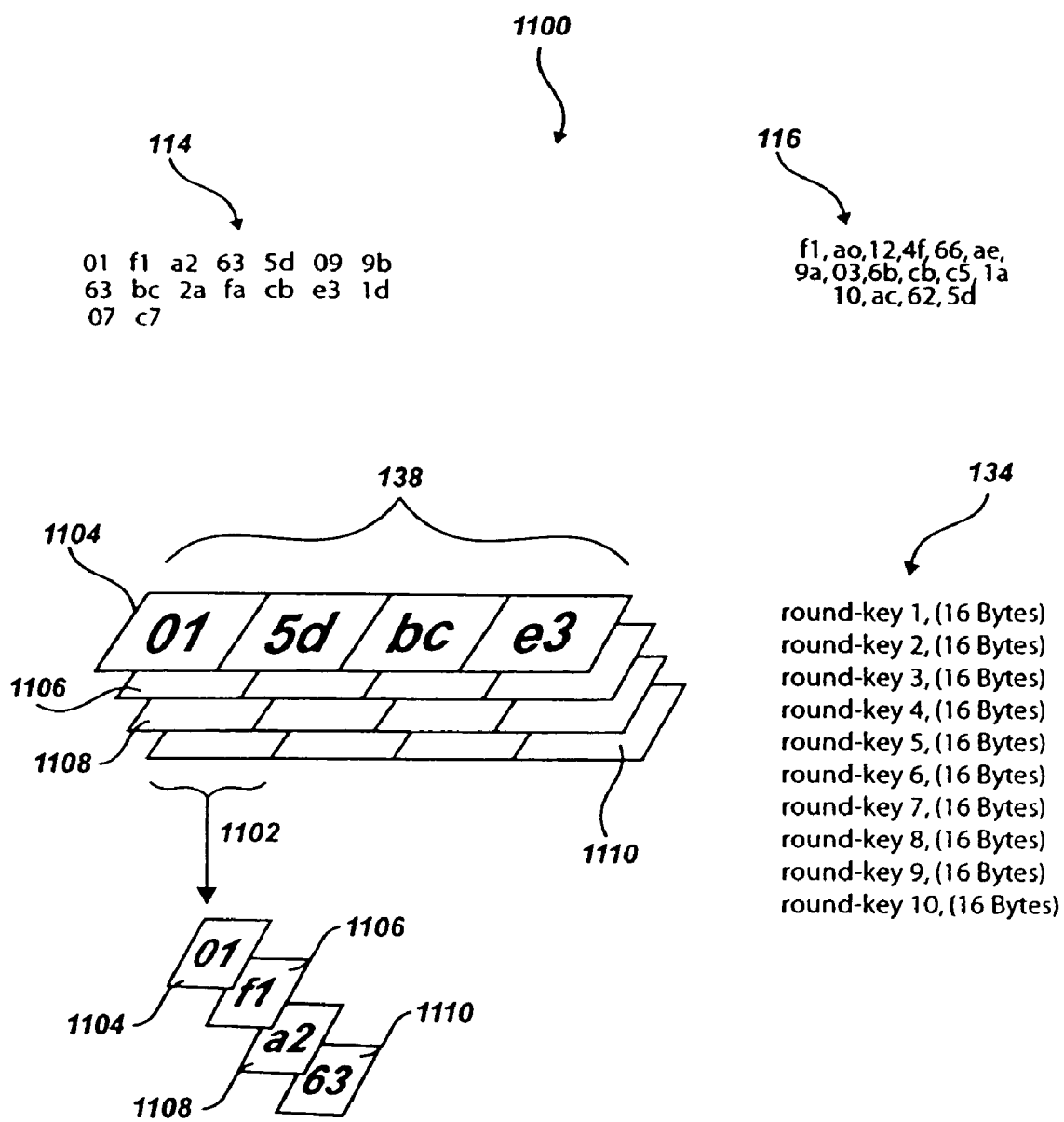
FIG. 11 shows an example of decryption data, including encrypted data and an encryption key.

FIG. 11 shows an example of data 1100 for use in decryption. The data 1100 includes encrypted data 114, which, for this example, is a set of sixteen 8-bit values (01, f1, a2, 63, 5d, 09, 9b, 63, bc, 2a, fa, cb, e3, 1d, 07, c7), and a 16-byte encryption key 116. For decryption processing on a GPU, the encrypted data 114 are packed into an encrypted texture 138. In the present example, the encrypted texture 138 is a 4×1 texture comprising four texels including a first texel 1102. The encrypted texture 138 (and each encrypted texel) has a red channel 1104, a blue channel 1106, a green channel 1108, and an alpha channel 1110. For example, the first encrypted texel 1102 has a red channel 1104 having a data value "01", a blue channel 1106 having a data value "f1", a green channel 1108 having a data value "a2", and an alpha channel 1110 having a data value "63".

It is to be understood that encrypted data 114 may be communicated to or retrieved by the encryption/decryption system 100. For example, the encrypted data 114 may be communicated to the encryption/decryption system 100 by a user through a user interface, read from the storage medium 108, or received from a server 152 or other device. The encryption key 116 may also be communicated to or retrieved by the encryption/decryption system 100 in different ways.

The encryption key 116 includes sixteen 8-bit (equivalent hexadecimal values are shown in the drawings for clarity) bytes. The system processor 102 may execute instructions to expand the encryption key 116 into ten 16-byte decryption round-keys 134.

In the preferred version, the decryption program(s) 130(b) utilizes four look-up tables for executing Rijndael decryption transformations. The look-up tables include an XOR table, an inverse S-box table, an xXOR table (first modified XTime table), and an x-xXOR table (second modified XTime table). In one version, the encryption look-up texture 400, described above, may also be utilized for decryption—specifically the XOR table 600 of the blue channel 406 and the xXOR table 700 of the green channel 404. In this version the x-xXOR table may be packed into the previously unused red channel 402 of the encryption look-up texture 400.

Figure 12:
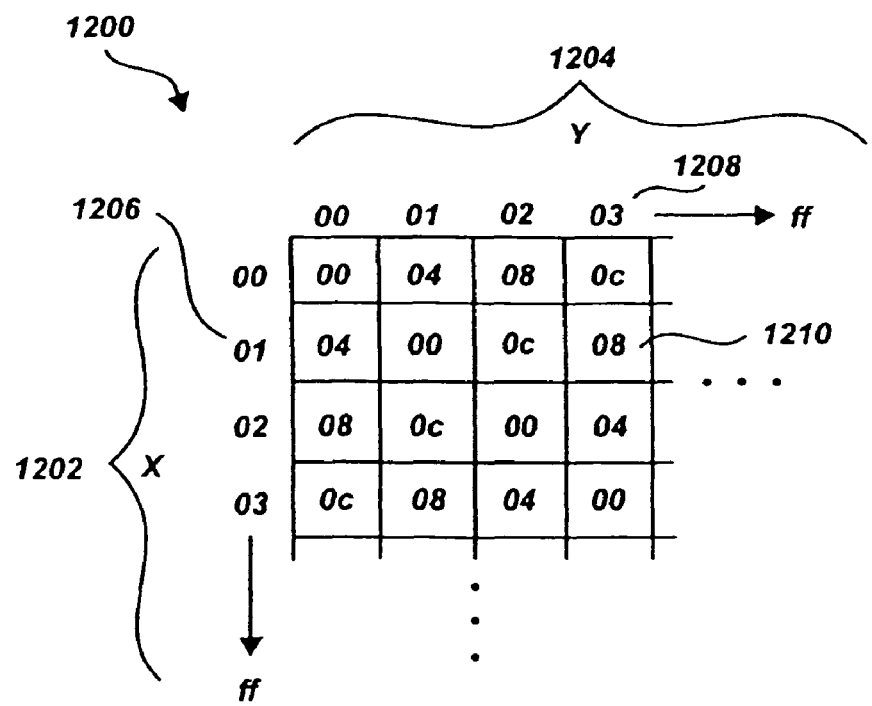
FIG. 12 shows a sample region of an x-xXOR look-up table of a channel of the look-up texture of FIG. 4.

FIG. 12 illustrates a portion of the x-xXOR table. The x-xXOR table 1200 has row address values "x" 1202 ranging from 00 to ff, and column address values "y" 1204 ranging from 00 to ff. The elements are derived from the formula: x-xXOR(x,y)=XTime(XTime(x^y)); where XTime denotes a finite field multiplication by 02, and ^ denotes the XOR operation. In other words, the x-xXOR table is populated with elements having values resulting from (a) an XOR operation of each row and column address pair, (b) a first finite field multiplication by 02 to the XOR operation result (from (a)), and (c) a second finite field multiplication by 02 to the first finite field multiplication result (from (b)). For example, referring to row value x="01", 1206, and column value y="03", 1208, x^y="02"; XTime(02)="04"; XTime (04)="08". Accordingly, element 1210 of the x-xXOR table 1200 has a value of "08". The x-xXOR table is referenced to obtain values for a pre-processing step to the InverseMixColumns transformation algorithm for decryption, explained below.

Figure 13:
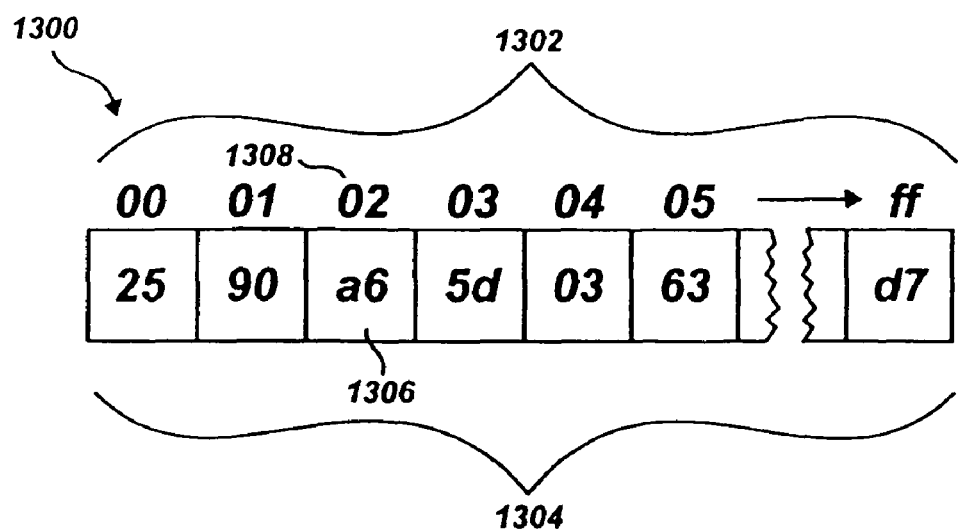
FIG. 13 shows a sample region of an inverse S-box look-up table of a look-up texture.

The inverse S-box table 1300, shown in FIG. 13, may be packed into the alpha channel of a decryption look-up texture 154. The inverse S-box table 1300 is a one-dimensional look-up table having addresses 1302 corresponding to values ranging from 00 to ff. The inverse S-box table 1300 is populated with elements 1304 corresponding to an inverse look-up in the Rijndael S-box. For example, the S-box substitution for "a6" is "02". Thus, in the inverse S-box table 1300, value "02", 1308, is substituted with "a6", 1306.

As discussed above with reference to FIG. 2, the acts of one version of setup instructions 200 for decryption include uploading the GPU 106 with the encrypted texture 138, the round-keys 134, and at least one decryption program 130(b) (Act 214). The GPU 106 initiates the decryption program(s) 130(b) in response to instructions received from the system processor 102.

Figure 14:
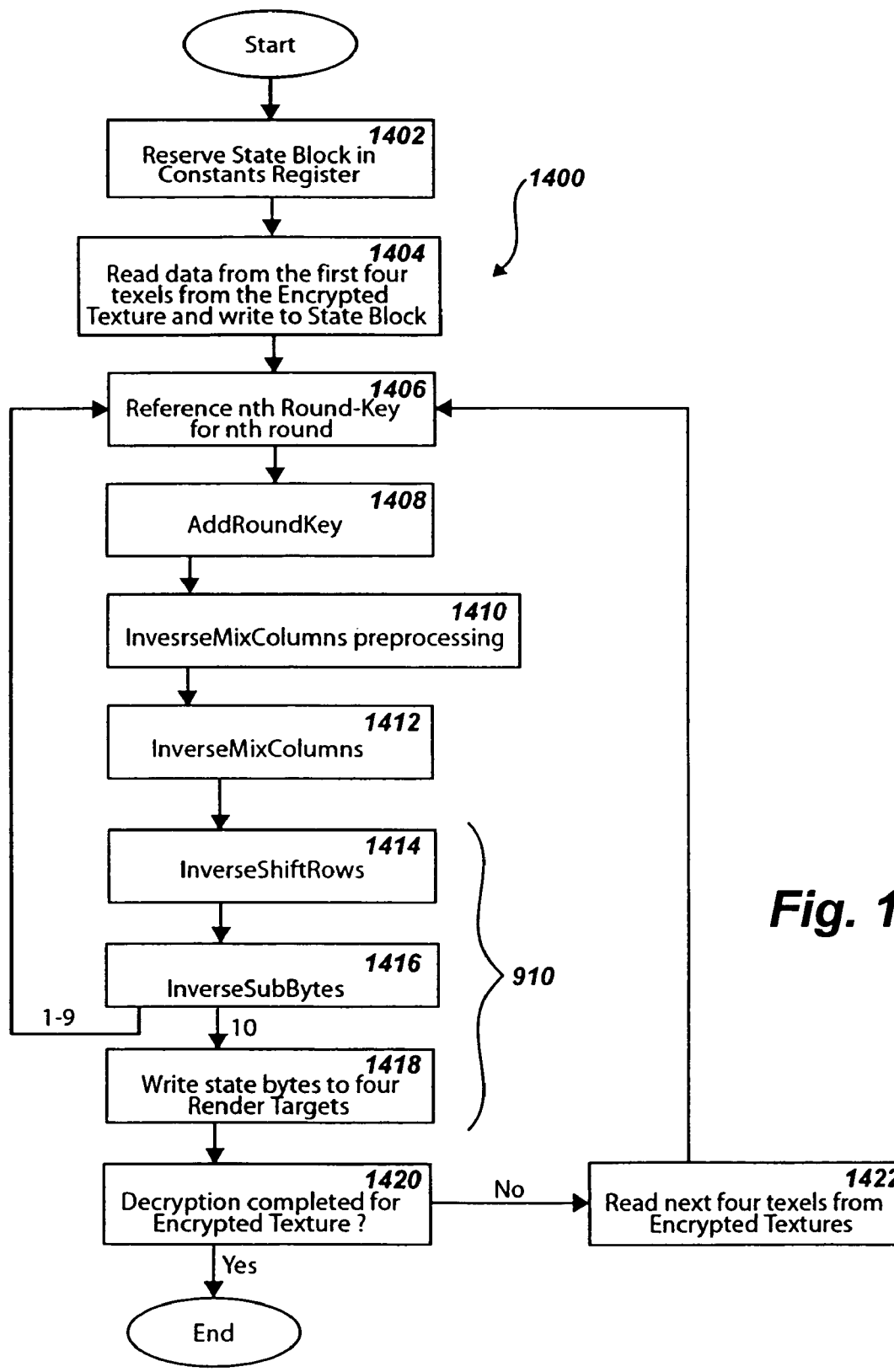
FIG. 14 shows the acts that the decryption program may take.

FIG. 14 shows decryption acts 1400 performed according to a preferred version of a decryption program 130(b). At least one state block 136 is reserved in the temporary register 160 for the decryption state (Act 1402). The state block 136 receives a first set of 16 bytes of ciphertext from the encrypted texture 138 (Act 1404). Note that the state block 136 will also hold the intermediate and final results of decryption transformations as they occur. Preferably, the number of state blocks created corresponds to the number of decryption program(s) 130(b) running on the GPU 106.

A first round-key, having sixteen bytes, is referenced from the GPU constants register 158 (Act 1406) for the first round. Note that a subsequent round-key is referenced for each subsequent round. In other words, the first round-key is referenced for the first round, the second round-key is referenced for the second round, the third round-key is referenced for the third round, etc.

The decryption transformations will now be discussed. The AddRoundKey transformation 1408 comprises sixteen look-ups into the XOR table 600. Each look-up is for one of the sixteen state byte and round-key byte member pairs. Like the Rijndael AddRoundKey step, the members of each pair are from matching locations in the round-key and the state block 136. For example, the state byte at column three, row two is paired with the round-key byte at column three, row two.

The InverseMixColumns preprocessing transformation 1410 can best be explained with reference to the illustrated state 1000 shown in FIG. 10. The illustrated state 1000 holds the values of the state block prior to an InverseMixColumns preprocessing transformation 1410. A preferred algorithm (expressed for C2) for executing an InverseMixColumns preprocessing transformation 1410 utilizes several look-ups into the x-xXOR table 1200 and the XOR table 600. The algorithm is performed for each column.

Algorithm 2: InverseMixColumns preprocessing transformation for decryption u = x-xXOR(B^J)
v = x-xXOR(F^N)
B = B^u
F = F^v
J = J^u
N = N^v The algorithm for the InverseMixColumns transformation is identical to the MixColumns transformation algorithm of encryption, discussed above. The resultant bytes are written into the state block 136 at locations that correspond to an InverseShiftRows transformation 1414. Specifically, the bytes in the first row of the state remain unchanged. The bytes of the second row are each shifted one column to the right, the bytes of the third row are each shifted two columns to the right, and the bytes of the fourth row are each shifted three columns to the right.

The InverseSubBytes transformation 1416 references the inverse S-box table 1300 and substitutes each byte of the state block 136 with the corresponding substitution byte.

The decryption transformations are repeated ten times for a state block 136. After the tenth transformation the state block 136 contains sixteen bytes of unencrypted data. The unencrypted data is written to four render targets (Act 1418). The bytes of the first column of the state are written to the first render target 150(a), the bytes of the second column of the state are written to a second render target 150(b), the bytes of the third column of the state are written to the third render target 150(c), and the bytes of the fourth column of the state are written to the fourth render target 150(d).

The status of decryption is determined (Act 1420). If decryption is not complete, then the bytes from the next four texels in the encrypted texture 138 are written to the state block 136 (Act 1422) and the first round-key is obtained from the round-key constants register 158 (Act 1406). The decryption transformation stages are repeated and the data of the final state is written to the four render targets 150(a) to 150(d). Decryption acts may continue until decryption is complete.

The decryption program 130(b) may include further acts such as uploading the data from the render targets 150(a) to 150(d) to the system processor 102 for storage, recordation, transmission, or other purpose. In a preferred version, the data is not uploaded to the system processor 102, but is instead visualized by the GPU 106. Visualization is a technique of presenting raw data in a readable format to a display device.

Figure 15:
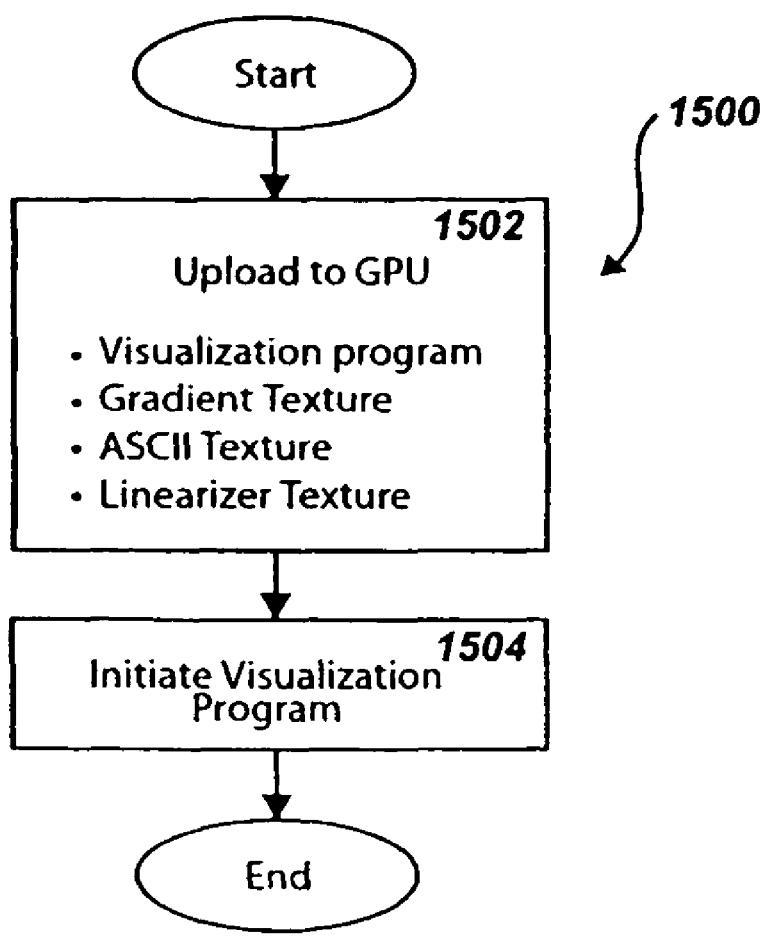
FIG. 15 shows setup instructions for visualizing decrypted data on the GPU.

FIG. 15 shows a version of acts 1500 to prepare the GPU 106 to visualize data. The system processor 102 uploads to the GPU 106 a visualization program 148, a gradient texture 140, an ASCII or other type of character texture 142, and a linearizer texture 144 (Act 1502). The system processor 102 provides a signal to initiate execution of the visualization program 148 in the GPU (Act 1504). A version of a visualization program (Visualization.txt) is included in the appendix of this application.

FIG. 16 shows one version of a 4×6 gradient texture 140. The values of each channel are listed vertically in each pixel for clarity (r, g, b, α). The values of the red channel uniformly increase from 0 to 1 along the columns and the values of the green channel uniformly increase from 0 to 1 down the rows. The values of the blue and alpha channels are zero throughout the gradient texture. For example, texel 0×0 1602 has a zero value for each channel, or (0, 0, 0, 0), and texel 1×4 has a red channel value=0.33 and a green channel value=0.8, or (0.33, 0.8, 0, 0). Although the 4×6 gradient texture 140 is shown (for clarity), in a preferred version, the gradient texture is an 8×20 texture (not shown). In the preferred version, the values of the red channel uniformly increase along the columns from 0 to 1 by increments of 0.125, and the values of the green channel uniformly increase down the rows from 0 to 1 by increments of 0.05.

Figure 17:
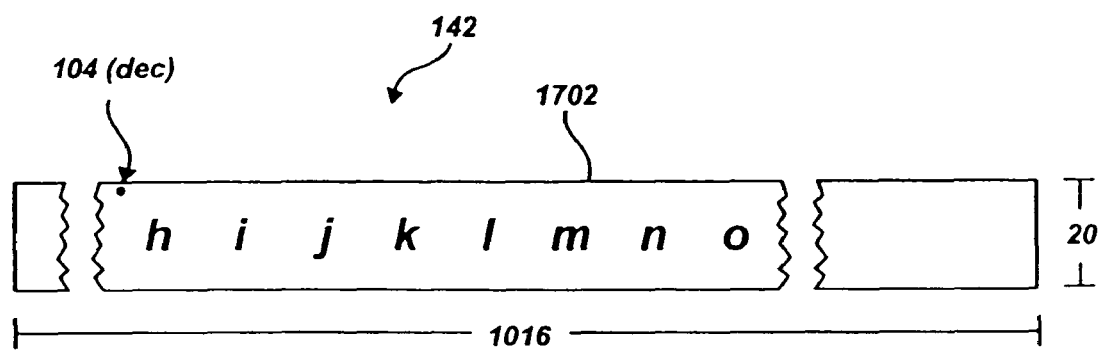
FIG. 17 shows an ASCII texture for use in visualizing decrypted data on the GPU.

FIG. 17 illustrates a portion of a preferred version of an ASCII texture 142, having 1,016 columns and 20 rows. Each ASCII character occupies 8 columns and 20 rows, providing 127 character spaces. A character in the ASCII texture 142 is indexed by its ASCII value. For example, the ASCII value for the character "h" is 104 (dec).

Figure 18:
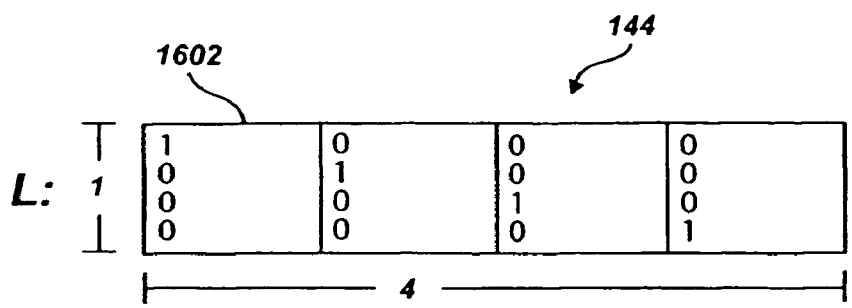
FIG. 18 shows a linearizer texture for use in visualizing decrypted data on the GPU.

FIG. 18 shows one version of a linearizer texture ("L") 144. The linearizer texture 144 has four texels as follows: red (1,0,0,0), green (0,1,0,0), blue (0,0,1,0) and transparent (0,0,0,1).

Figure 19:
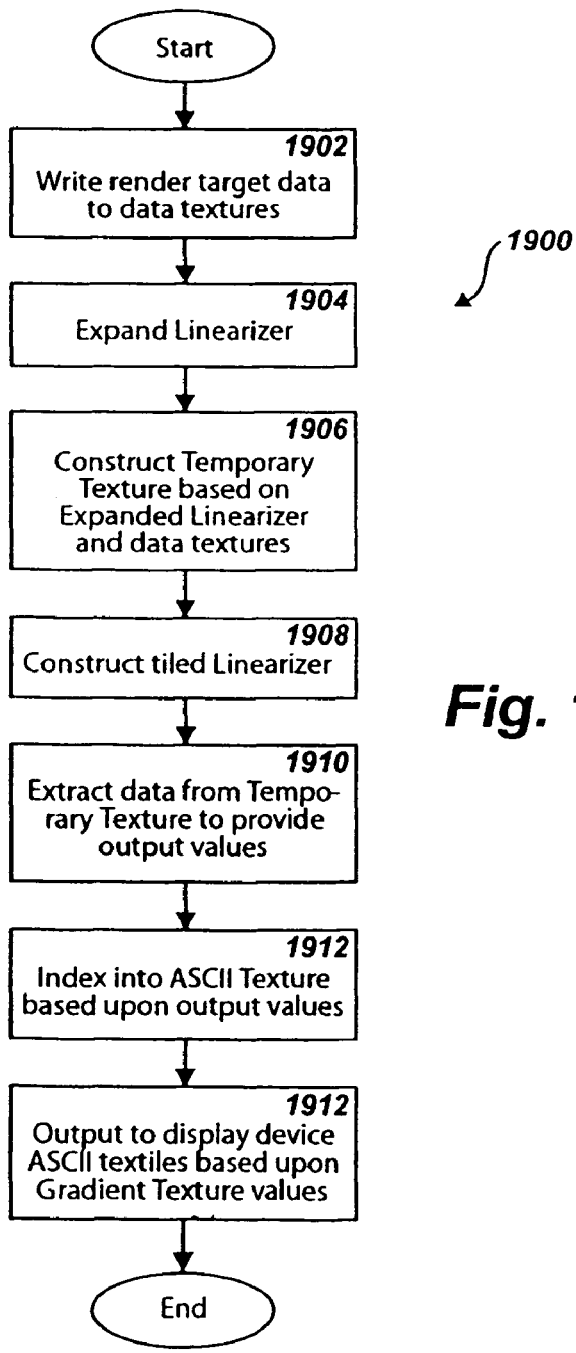
FIG. 19 shows the acts that the visualization program may take.
Figure 20:
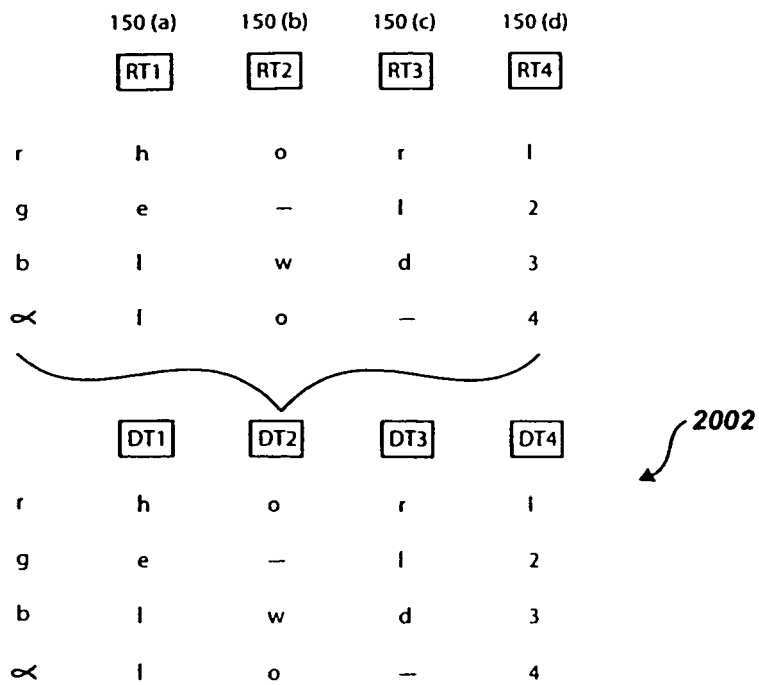
FIG. 20 illustrates decrypted data written to data textures for use by a visualization program.
Figure 21:
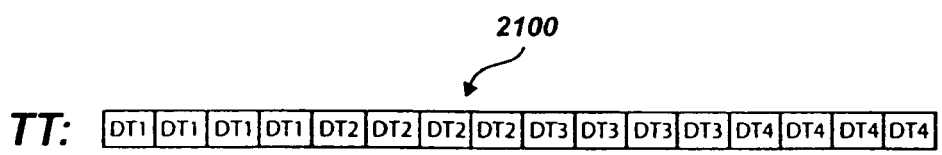
FIG. 21 illustrates a temporary texture for use in visualizing decrypted data on the GPU.

FIG. 19 shows visualization acts 1900 performed according to a preferred version of a visualization program-148. The decrypted data from the render targets 150(a) to 150(d) are written to data textures ("DT1" to "DT4") 2002 (Act 1902), shown in FIG. 20. The linearizer is expanded (Act 1904) by a factor of four. A temporary texture ("TT") 2100, FIG. 21, is constructed based upon the expanded linearizer and the data textures 2002 (Act 1906). The temporary texture 2100 is based upon the following shader equation:

$$TT=(EL.r*DT1)+(EL.g*DT2)+(EL.b*DT3)+(EL.\alpha*DT4);$$

where EL is the expanded linearizer and DT are data textures.

Equation 1: Temporary Texture

Figure 22:
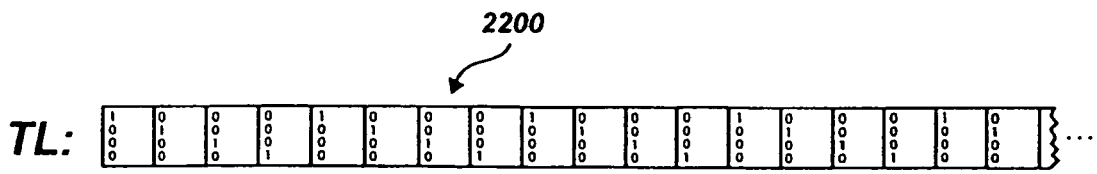
FIG. 22 illustrates a tiled linearizer for use in visualizing decrypted data on the GPU.

The linearizer is tiled (Act 1908), to create a tiled linearizer ("TL") 2200, shown in FIG. 22.

The data values are extracted from each texel in the temporary texture 2100 (Act 1910) by applying the following dot-product equation to the four values in each texel and the four values in each texel in the tiled linearizer 2200:

$$\text{OUTPUT DATA VALUE}=L.r\cdot TT.r+L.g\cdot TT.g+L.b\cdot TT.b+L.\alpha\cdot TT.\alpha;$$

where L is the linearizer and TT is the temporary texture.

Equation 2: Dot Product of Temporary Texture Texel and Tiled Linearizer Texel

For example, based upon the data textures 2002, the first five output values are:

OUTPUT VALUE=104 ("h")

OUTPUT VALUE=101 ("e")

OUTPUT VALUE=108 ("l")

OUTPUT VALUE=108 ("l")

OUTPUT VALUE=111 ("o")

The output values are referenced to index into a column of the ASCII texture 142 that corresponds to the location of the ASCII character (Act 1912). For example, output value "104" indexes to the first texel for the letter "h", which is at the $832^{nd}$ column (8*104=832) as shown in FIG. 17. The remaining texels for the letter "h" are obtained by indexing further into the ASCII table 142 based upon the values from each red and green texel of the gradient texture 140. Prior to indexing, the gradient decimal values are scaled to integers. For example, in the preferred version of the gradient texture (8×20), a texel having channel values (0.25, 0.2, 0, 0) is scaled to (2, 4, 0, 0). Using "104" as an offset, the gradient texel (2, 4, 0, 0) indexes into the "h" region of the ASCII texture 142 to texel 834×4. The ASCII character is rendered to a display device, such as a frame buffer, by accessing texels in the ASCII texture according to coordinates based upon the gradient texture 140. The next output value (e.g., 101, "e") is referenced to index back into a column of the ASCII texture 142 to render the next ASCII character to the display device. The decrypted data values are thus visualized by the GPU 106 without communicating the data values to the system processor 102.

All of the discussion above, regardless of the particular implementation being described, is exemplary in nature, rather than limiting. For example, although selected aspects, features, or components of the implementations are depicted as being stored in memories, all or part of the systems and methods consistent with the encryption/decryption system may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the encryption/decryption system are described, methods, systems, and articles of manufacture consistent with the system may include additional or different components. For example, a system processor may be implemented as a microprocessor, microcontroller, application specific integrated circuit (ASIC), discrete logic, or a combination of other type of circuits or logic. Similarly, memories may be DRAM, SRAM, Flash or any other type of memory. Parameters (e.g., keys), databases, tables, and other data structures may be separately stored and managed, may be incorporated into a single memory or database, or may be logically and physically organized in many different ways. Programs may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An encryption method comprising:
loading, from a system processor, a state block in a graphics processing unit ("GPU") with a plurality of data bytes from an unencrypted texture;
referencing a first look-up table in the GPU to obtain a plurality of first transformation bytes based upon the plurality of data bytes and a first round-key;
writing the plurality of first transformation bytes to the state block according to a ShiftRows transformation; and
referencing both a second look-up table and a third look-up table in the GPU to obtain a plurality of second transformation bytes based upon the first transformation bytes in the state block; wherein executing a setup program communicates from the system processor to the GPU a look-up texture having the first, second, and third look-up tables, and the unencrypted texture.

2. The method of claim 1 wherein the first look-up table is a combination AddRoundKey and SubBytes transformation table.

3. The method of claim 1 wherein the second look-up table is an XOR look-up table and wherein referencing both the second look-up table and the third look-up table implement a MixColumns transformation.

4. The method of claim 1 comprising:
continuing to execute encryption transformations in the GPU until the state block contains Rijndael ciphertext; and
writing the Rijndael ciphertext to at least one render target.

5. The method of claim 1 comprising communicating from a system processor to the GPU a look-up texture having the first, second, and third look-up tables.

6. The method of claim 5 comprising communicating between the system processor and the GPU, for encrypting the data bytes, to upload to the GPU a set of ten round-keys including the first round-key, an encryption program, and a command to initiate encryption.

7. The encryption method of claim 1 comprising:
creating the unencrypted texture from unencrypted data;
expanding an encryption key to a plurality of round-keys, including the first round-key;
communicating the plurality of round-keys to a constants register in the GPU; and
communicating an encryption program to the GPU.

8. The method of claim 1 comprising initiating shader code instructions for referencing the first, second, and third look-up tables.

9. The method of claim 4 comprising:
uploading the ciphertext to a system processor; and
transmitting the ciphertext to a server.

10. A computer readable storage device having graphic processing unit ("GPU") executable instructions comprising instructions to:
load, from a system processor, a state register with a plurality of data bytes from an unencrypted texture; reference a first look-up table in a GPU to obtain a plurality of first transformation bytes based upon the plurality of data bytes and a first round-key;
write the plurality of first transformation bytes to the state register according to a ShiftRows transformation; and
reference both a second look-up table and a third look-up table in the GPU to obtain a plurality of second transformation bytes based upon the first transformation bytes in the state block; wherein executing a setup program communicates from the system processor to the GPU a look-up texture having the first, second, and third look-up tables, and the unencrypted texture.

11. The computer readable storage device of claim 10 further comprising instructions to:
create the unencrypted texture from unencrypted data;
expand an encryption key to a plurality of round-keys, including the first round-key;
communicate the plurality of round-keys to a constants register in the GPU;
communicate an encryption program to the GPU, the encryption program having the GPU executable instructions.

12. An encryption system comprising:
a graphics processing unit ("GPU");
a system processor in communication with the GPU; and
a setup program operable to communicate between the GPU and the system processor to upload from the system processor to the GPU:
an unencrypted texture having a plurality of data bytes,
a plurality of round-keys including a first round-key,
a look-up texture,
an encryption program, and
a command to initiate encryption, wherein the encryption program is operable to encrypt the data by executing encryption acts only on the GPU.

13. The encryption system of claim 12 further comprising a system memory in communication with the system processor and having unencrypted data and an encryption key, the setup program operable to generate the plurality of round-keys based upon the encryption key, and generate the unencrypted texture based upon the unencrypted data.

14. The encryption system of claim 12 further comprising:
a first look-up table configured to implement a combination AddRoundKey and SubBytes transformation;
a second look-up table configured to implement an XOR operation; and
a third look-up table, wherein the second look-up table and the third look-up table are configured to together implement a MixColumns transformation operation.

15. The encryption system of claim 14 wherein the look-up texture comprises the first, second, and third look-up tables.

16. The encryption system of claim 12 wherein the encryption program is operable to:
load a state block with a plurality of data bytes from the unencrypted texture, reference a first look-up table to obtain a plurality of first transformation bytes based upon the plurality of data bytes and the first round-key,
write the plurality of first transformation bytes to the state register according to a ShiftRows transformation,
reference both a second look-up table and a third look-up table in the GPU to obtain a plurality of second transformation bytes based upon the first transformation bytes in the state block, and
continue to execute encryption transformations in the GPU to obtain a block of ciphertext.

17. The encryption system of claim 16 comprising a plurality of render targets to receive the clock of ciphertext.

18. A decryption system comprising:
a graphics processing unit ("GPU");
a system processor in communication with the GPU; and
a setup program operable to communicate between the GPU and the system processor to upload from the system processor to the GPU:
an encrypted texture having ciphertext,
a plurality of round-keys including a first round-key,
a look-up texture,
a decryption program, and a command to initiate decryption, wherein the decryption program is operable to decrypt the ciphertext by executing decryption acts only on the GPU.

19. The decryption system of claim 18 wherein the look-up texture comprises:
   a first look-up table configured to implement an AddRoundKey transformation;
   a second look-up table to implement an inverse S-Box substitution transformation;
   a third look-up table configured to implement, with the first look-up table, InverseMixColumns preprocessing transformation operations; and
   a fourth look-up table configured to implement, with the first look-up table, InverseMixColumns transformation operations.

20. The decryption system of claim 18 comprising a system memory in communication with the system processor and having encryption data and an encryption key, the setup program operable to generate the plurality of round-keys based upon the encryption key, and generate the encrypted texture based upon the encrypted data.

* * * * *